(12) United States Patent
Wilkinson et al.

(10) Patent No.: US 11,966,702 B1
(45) Date of Patent: Apr. 23, 2024

(54) SYSTEM AND METHOD FOR SENTIMENT AND MISINFORMATION ANALYSIS OF DIGITAL CONVERSATIONS

(71) Applicant: AlphaVu, LLC, Washington, DC (US)

(72) Inventors: Scott G. Wilkinson, Baltimore, MD (US); Marshall McCraw, Norfolk, VA (US); Michael Smith, Washington, DC (US); Zachary Hernandez, Washington, DC (US)

(73) Assignee: ALPHAVU, LLC, Washington, DC (US)

( * ) Notice: Subject to any disclaimer, the term of this patent is extended or adjusted under 35 U.S.C. 154(b) by 476 days.

(21) Appl. No.: 17/404,959

(22) Filed: Aug. 17, 2021

Related U.S. Application Data (60) Provisional application No. 63/066,562, filed on Aug. 17, 2020.

(51) Int. Cl.
*G06F 40/30* (2020.01)
*G06F 18/22* (2023.01)
(Continued)

(52) U.S. Cl.
CPC .............. *G06F 40/30* (2020.01); *G06F 18/22* (2023.01); *G06F 18/2415* (2023.01); *G06N 3/045* (2023.01)

(58) Field of Classification Search
CPC ...... G06F 40/30; G06F 18/22; G06F 18/2415; G06N 3/045
(Continued)

(56) References Cited

U.S. PATENT DOCUMENTS 8,166,032 B2 * 4/2012 Sommer ............... G06F 16/355
707/758
8,682,649 B2 * 3/2014 Bellegarda ............. G10L 13/10
704/10
(Continued)

FOREIGN PATENT DOCUMENTS

CN 106598942 A * 4/2017 .......... G06F 16/355
CN 107357785 A * 11/2017
(Continued)

OTHER PUBLICATIONS

García-Mendoza CV, Gambino OJ, Villarreal-Cervantes MG, Calvo H. Evolutionary Optimization of Ensemble Learning to Determine Sentiment Polarity in an Unbalanced Multiclass Corpus. Entropy (Basel). Sep. 12, 2020;22(9):1020. doi: 10.3390/e22091020. PMID: 33286789; PMCID: PMC7597113.*

*Primary Examiner* — Edwin S Leland, III
(74) *Attorney, Agent, or Firm* — MILES & STOCKBRIDGE P.C.; David R. Schaffer (57) ABSTRACT

This is a system for sentiment analysis and misinformation detection for text transcriptions of conversations and statement. More particularly, this is a software system that uses neural network, machine learning (ML) models, which have been trained solely on text sourced from the internet, for the classification of the sentiment and risk of misinformation conveyed through a piece of text as it relates to a specified subject matter. Such a system typically is used on digital communication platforms, such as social media sites, to enable the determination of public opinion and perception in order to provide competitive intelligence for decision-making.

15 Claims, 6 Drawing Sheets

(51) Int. Cl.
  *G06F 18/2415* (2023.01)
  *G06N 3/045* (2023.01)
(58) Field of Classification Search
  USPC .............................................................. 704/9
  See application file for complete search history.

(56) References Cited

U.S. PATENT DOCUMENTS

| | | | | |
|---|---|---|---|---|
| 8,977,573 | B2* | 3/2015 | Daya | G06Q 50/01 |
| | | | | 705/319 |
| 9,251,468 | B2* | 2/2016 | Zhou | G06Q 10/06398 |
| 9,317,498 | B2* | 4/2016 | Baker | G06F 40/143 |
| 9,684,852 | B2* | 6/2017 | Cao | G06N 5/04 |
| 9,710,459 | B2* | 7/2017 | Baldwin | G06Q 50/01 |
| 9,779,385 | B2* | 10/2017 | Rajaram | G06Q 10/10 |
| 10,073,830 | B2* | 9/2018 | Walia | G06F 16/35 |
| 10,162,891 | B2* | 12/2018 | Kadam | G06F 16/95 |
| 10,565,403 | B1* | 2/2020 | Waters | G06F 40/166 |
| 10,664,764 | B2* | 5/2020 | Gundecha | G06N 20/00 |
| 10,679,147 | B2* | 6/2020 | Arpat | G06Q 50/01 |
| 10,929,772 | B1* | 2/2021 | Diuk Wasser | G06N 20/00 |
| 2005/0114161 | A1* | 5/2005 | Garg | G06Q 30/02 |
| | | | | 703/2 |
| 2008/0249764 | A1* | 10/2008 | Huang | G06F 40/30 |
| | | | | 704/9 |
| 2010/0257117 | A1* | 10/2010 | Shvadron | G06F 16/313 |
| | | | | 705/36 R |
| 2012/0278064 | A1* | 11/2012 | Leary | G06F 40/253 |
| | | | | 704/9 |
| 2013/0268534 | A1* | 10/2013 | Mathew | G06F 16/35 |
| | | | | 707/740 |
| 2014/0025427 | A1* | 1/2014 | Bastian | G06Q 10/06398 |
| | | | | 705/7.29 |
| 2014/0358942 | A1* | 12/2014 | Ramesh | G06Q 30/0255 |
| | | | | 707/736 |
| 2015/0106155 | A1* | 4/2015 | Castellanos | G06Q 50/01 |
| | | | | 705/7.29 |
| 2016/0189181 | A1* | 6/2016 | McClave | G06Q 50/01 |
| | | | | 705/7.33 |
| 2016/0350651 | A1* | 12/2016 | Devarajan | G06F 40/30 |
| 2017/0213138 | A1* | 7/2017 | Bojja | G06N 20/00 |
| 2017/0308798 | A1* | 10/2017 | Grom | G06Q 50/26 |
| 2019/0342406 | A1* | 11/2019 | Borden | H04L 43/00 |
| 2019/0379629 | A1* | 12/2019 | Sheppard | H04L 51/52 |
| 2020/0159826 | A1* | 5/2020 | Lev Tov | G06F 40/35 |
| 2021/0027016 | A1* | 1/2021 | Ji | G06F 40/216 |
| 2021/0150408 | A1* | 5/2021 | Kwatra | G06N 20/00 |
| 2022/0148699 | A1* | 5/2022 | Kogan | G16H 10/20 |

FOREIGN PATENT DOCUMENTS

| | | | | | |
|---|---|---|---|---|---|
| CN | 108038166 | A | * | 5/2018 | |
| CN | 110162597 | A | * | 8/2019 | |
| CN | 110457480 | A | * | 11/2019 | G06F 16/35 |
| CN | 110866405 | A | * | 3/2020 | |
| CN | 111143564 | A | * | 5/2020 | G06F 16/355 |
| CN | 111858933 | A | * | 10/2020 | G06F 16/35 |
| WO | WO-2020106267 | A1 | * | 5/2020 | G06F 40/30 |
| WO | WO-2020125445 | A1 | * | 6/2020 | G06F 16/35 |
| WO | WO-2022099081 | A1 | * | 5/2022 | G16H 10/60 |

* cited by examiner

SYSTEM AND METHOD FOR SENTIMENT AND MISINFORMATION ANALYSIS OF DIGITAL CONVERSATIONS

TECHNICAL FIELD OF THE INVENTION

This invention relates to the advancement of the capabilities of organizations and individuals in understanding their audiences. Specifically, this invention allows the organizations and the individuals to understand their audience's perceptions of the organization's or the individual's content and information, as well as their respective audience's opinions on predefined factual information which may directly relate to the organization's or the individuals dealings. Such determinations are made through the use of quantitative analyses on text collected from conversations and statements made about the organizations or the individuals.

BACKGROUND OF THE INVENTION

Digital communications platforms have a tremendous effect on public discourse in the world. In order to facilitate the efforts of organizations and individuals in engaging in positive and factual discussions with their audience members, it is critical for those organizations and individuals to efficiently, rapidly, and economically understand their respective audience members' beliefs and opinions. While existing methods and techniques have previously accomplished similar tasks as determining the public sentiment related to an entity or predicting whether a text contains misinformation, such methods perform these classifications using less accurate processes. For instance, when classifying misinformation, existing methods entirely rely on the capabilities of the ML models to detect and quantify the degree of deviation from the truth, as defined in the methods.

BRIEF SUMMARY OF THE INVENTION

The capabilities of this system are twofold. First, a given body of text produced by a single audience member in an audience of a specific organization or the individual is transcribed from a digital communication platform. This text is then processed by a series of mathematical text vectorization techniques and subsequently passed to a series of machine learning (ML) models. These ML models, which are based off a neural network architecture, make several classifications as to the sentiment conveyed about the organization or the individual through the audience member's text. These classifications are then combined in a phenomenological model, which calculates a final, numeric classification called a sentiment score, about the polarity and strength of the sentiment conveyed through the text. The organization or the individual can then repeat this classification process on their or the individual's entire audience on the digital communication platform to determine the organization's or the individual's audience members' public sentiment.

Second, the organization or the individual may want to determine whether its or the individual's audience is in factual agreement with its or the individual's agenda. In this case, the same mathematically processed text is numerically compared to a given set of text, which the organization has predefined as the truth. For instance, NASA may use "the Earth orbits around the sun" as a piece of factually correct information. The numerical comparison quantitatively assesses how similar a given piece of text from the audience compares to the factual text. When combined with the sentiment score of the text, these metrics allow the organization or the individual (hereinafter referred to as "the organization" for ease and clarity) to understand the public perception of its or the individual's agenda as conveyed by the audience member's text communications on the digital communication platform.

BRIEF DESCRIPTION OF THE DRAWINGS

Non-limiting and non-exhaustive embodiments of the presently disclosed subject matter are described with reference to the following figures, wherein like reference numerals and/or indicia refer to like parts throughout the various views unless otherwise precisely specified.

DETAILED DESCRIPTION

While ML has rapidly progressed in the past decade, the predictive capability of ML models is lacking, but can be bolstered by introducing additional information and using a plurality of ML models to perform simpler tasks and reconciling their results in an analytical, heuristic model for the phenomena being studied. Such an approach, as in the presently disclosed subject matter, when used for either sentiment or misinformation quantification, can allow for far more accurate and insightful feedback from the ML system. These elements can be seen in FIGS. 3 and 5. In contrast to previous methods, which have considered cues other than the text, for example, when analyzing public sentiment on a digital communication platform, these previous methods have only looked at the interactions (e.g. likes and dislikes) of the audience members with the organization. While the current approach is very direct, in contrast, a text-only approach of the presently disclosed subject matter provides a more nuanced decision-making ability. Furthermore, when classifying sentiment, this system also considers the context of the text and not just the text itself. For instance, if an individual A were to respond in a dissenting manner to a comment made by individual B about an organization, the sentiment of individual B's comment would be considered when identifying the true sentiment of individual A's comment. If B were commenting unfavorably about the organization and A were commenting unfavorably about B's views, then the sentiment of A's comment would be flipped to show they are in favor of the organization.

Figure 6:
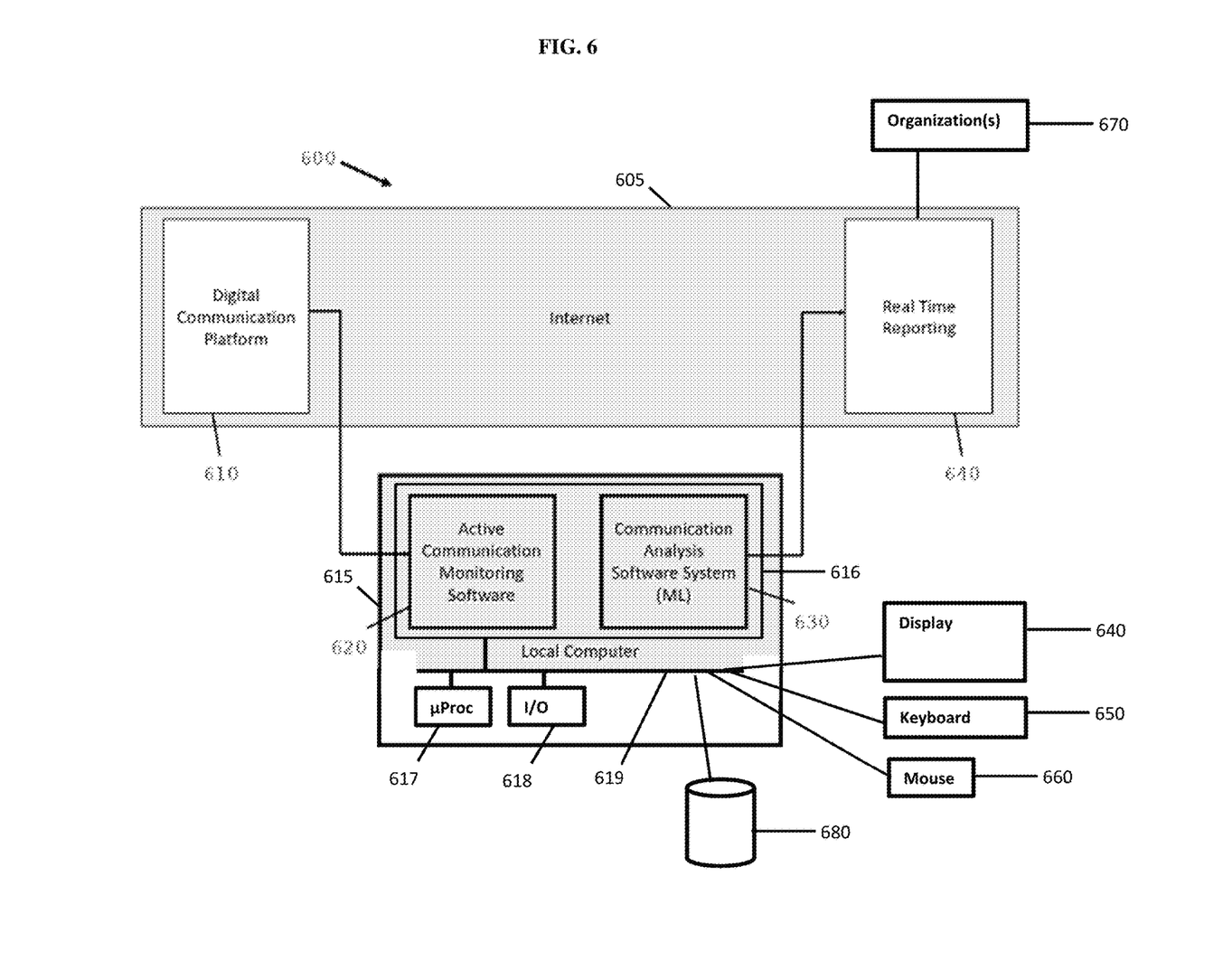
FIG. 6 is a block diagram illustrating the full use of the system in which communication monitoring software obtains digital transcriptions of conversations and statements made on digital communication platforms, analyzes and extracts the quantitative sentiment and misinformation risk values using the processes outlined in the previous figures, and reports the results back over the Internet, or another communication network, in real time, in accordance with various embodiments of the disclosed subject matter.

FIG. 6 is a block diagram of a system 600 for use to analyze quantitatively the sentiment and misinformation risk values of conversations and statements made on a digital communication platform for example, but not limited to, Facebook, Twitter, or Reddit. The processes are performed by a series of interactions between software running on a specially configured local computer 615, at least one digital communication platform 610, and the Internet 605. The local computer 615 in question may or may not be in possession of the organization attempting to improve its understanding of its audience. The specially configured local computer 615 also may be running on a variety of computer operating systems (OS) including but not limited to Linux, Windows, and Mac OS. While the embodiment of the specially configured local computer 615 in FIG. 6 in which an embodiment of the presently disclosed subject matter is shown as one system, in other embodiments, the functionality of the can be implemented in one or more distributed systems. In FIG. 6, the specially configured local computer 615 can include a processor 617 that is communicatively connected to a bus 619 or other communication system, is for processing information and can be a one of many types of general purpose or specific purpose processors, as well as an application-specific integrated circuit ("ASIC") processor. The specially configured local computer 615 further includes a memory 616 for storing data, information and processor-executable instructions such as for performing sentiment and misinformation analysis of the present method and the operating system, as well as data in a patient dental record database 680. Memory 616 is communicatively connected to bus 619, which is also communicatively connected to a communication input/output (I/O) device 618, which is configured to enable communications with internal specially configured local computer 615 components and with Internet 605 via the one or more Internet communications connections. Communication device 618 can include one or more network interface (NIC) cards for a wired network connection (e.g., but not limited to, a cable, an Ethernet, or a fiber optic connection) and a wireless network connection (e.g., but not limited to, a Wi-Fi, a cellular, an infrared, and a radio connection). Peripheral devices including, but not limited to, a display 640, a keyboard 650, and a mouse 660 are communicatively connected to the bus 619 and specially configured local computer 615.

Figure 1:
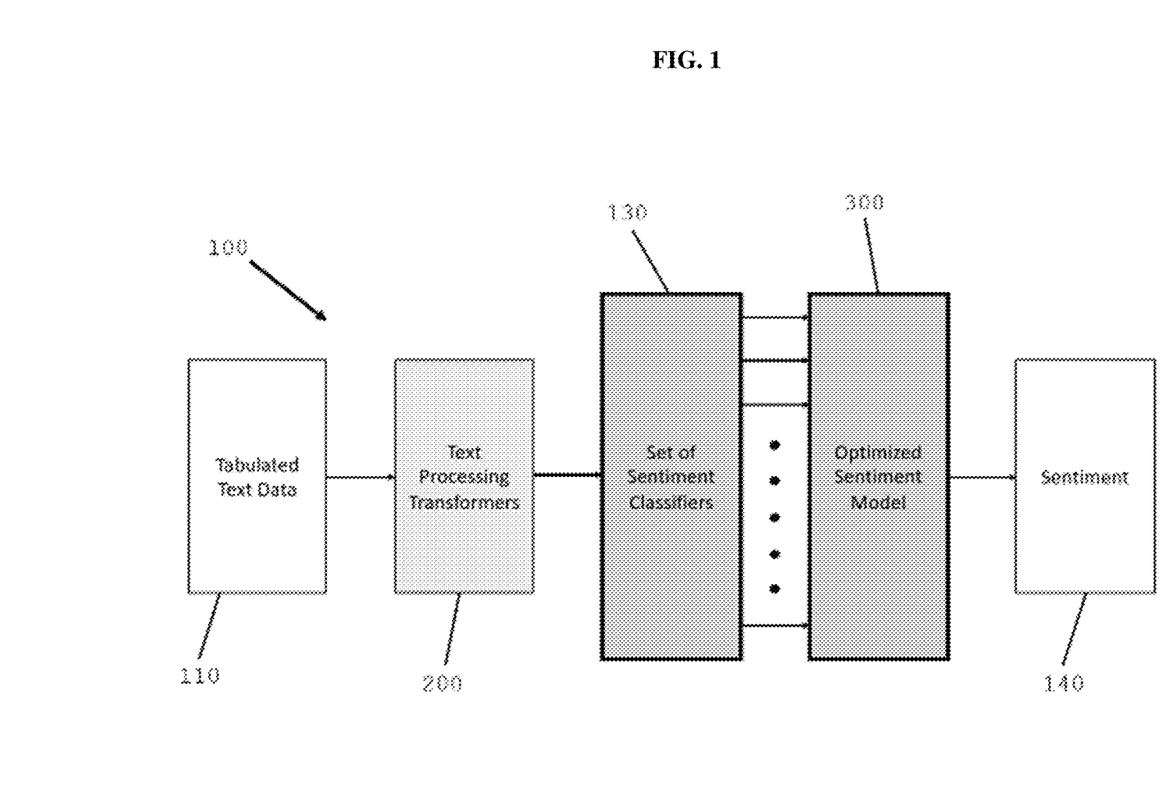
FIG. 1 is a block diagram illustrating the full process of determining a quantitative sentiment value of a batch of text, in accordance with various embodiments of the disclosed subject matter.
Figure 4:
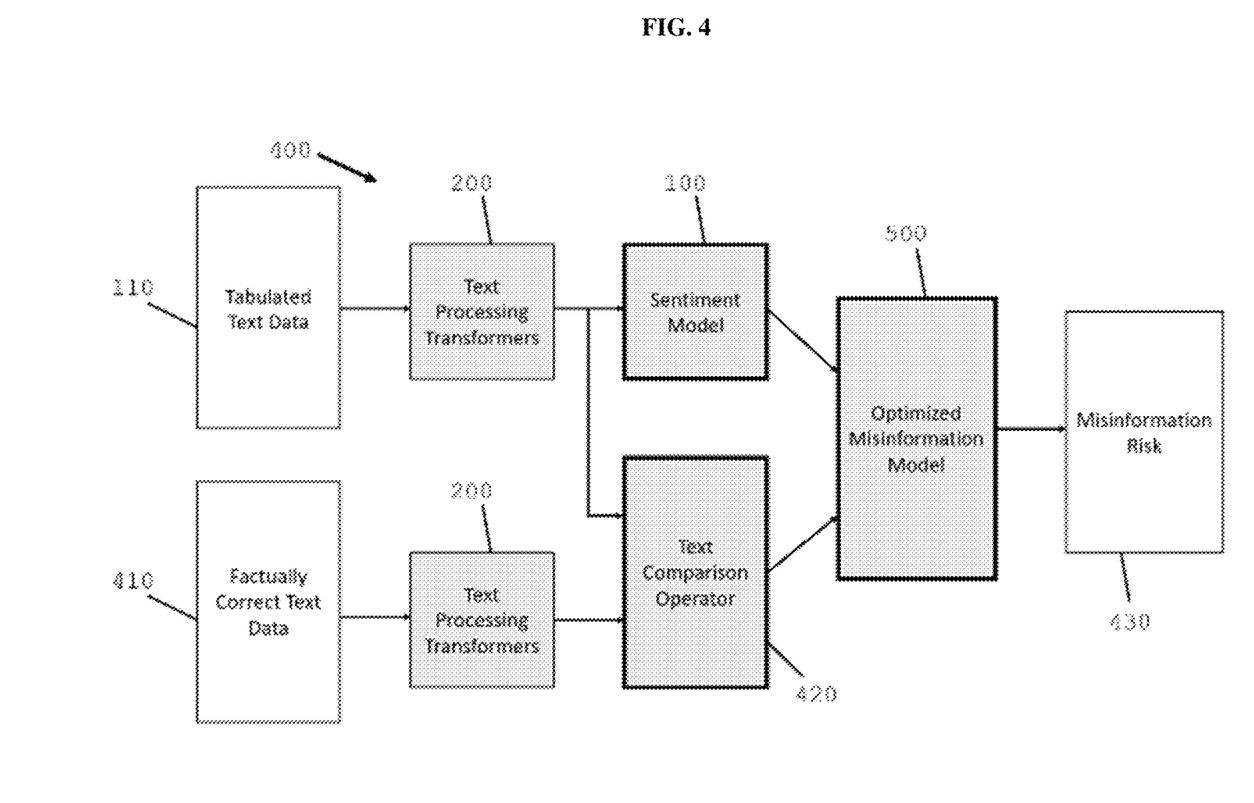
FIG. 4 is a block diagram illustrating the full process of determining the quantitative misinformation risk value of a batch of text, in accordance with various embodiments of the disclosed subject matter.

Text transcriptions of conversations and statements relating to a given organization are actively obtained by means of a communication monitoring software 620, which may use elements of one or more Application Program Interfaces (APIs) (not shown) that are provided by the digital communication platform 610, which is where the conversations and statements of interest are made. Such text transcriptions either may be passed individually or in batches to a communication analysis software 630, which, using the processes outlined below, extracts numerically valued sentiment and misinformation risk labels for the text transcriptions. These numeric labels are then reported in real time 640 to the organization 670 to offer insight on the analytics of their audiences on the digital communication platform 610. FIGS. 1 and 4 provide more detailed block diagrams, which outline the processes performed on the specially configured local computer to extract quantitative sentiment and misinformation risk values, respectively, which will be described in relation to FIGS. 1-6.

Figure 2:
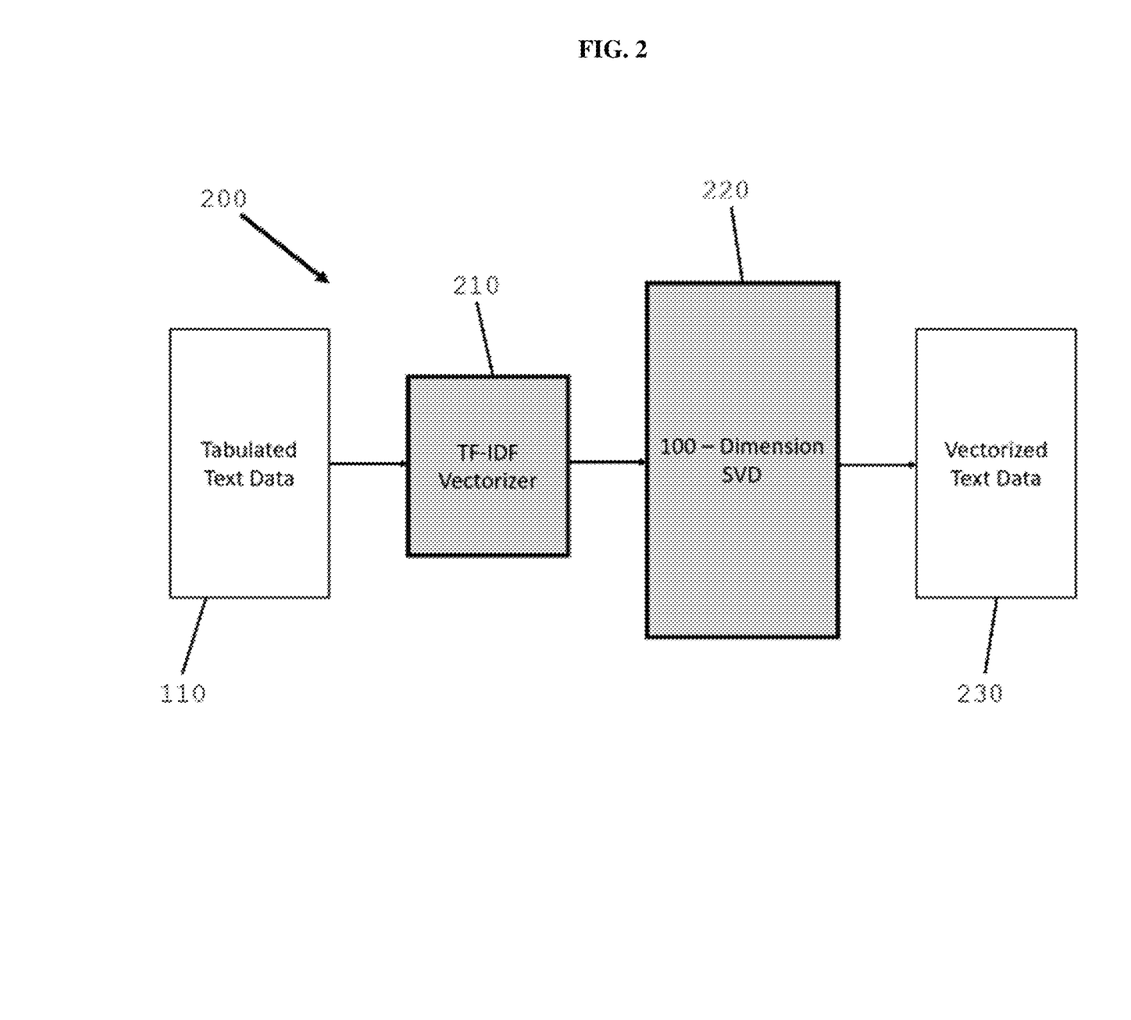
FIG. 2 is a more detailed block diagram illustrating the processes needed within FIG. 1 in which, a batch of text is transformed via Term Frequency-Inverse Document Frequency (TF-IDF) vectorization followed by 100—Dimensional Single Value Decomposition (SVD). The end result of this processing scheme gives a numerically vectorized batch of text, in accordance with various embodiments of the disclosed subject matter.

First, either a batch or a single tabulated text transcription of a conversation or statement 110 downloaded from a digital communication platform is vectorized using a TF-IDF vectorization scheme 210, which was originally fit on the ML training data and configured to first tokenize unigrams (single words) and bigrams (double words). In this process, the TF-IDF vectorizer 210 counts the frequency of occurrence of each token within the text and then assigns a numeric weight to each token, thus allowing the most common and least common tokens to be excluded from the analysis. Such a process is important to perform to throw out non-contextual words like 'the' or 'is' for example.

The remaining tokens and their frequency of occurrence form the basis of a vector space which then describes the body text as a superposition of the basis unigram or bigram vectors. This text vector is then passed to a 100-Dimensional SVD 220, which was originally fit on the ML training data. This operation is essential to reduce the dimensionality of the feature space of the problem and can be thought of as approximating the text vector by keeping only the 100 most informative unigrams or bigrams. This further cuts down on the number of potentially redundant unigrams or bigrams that may be in the text vector.

Following these transformations depicted in 200, the text or batch of text has been transformed into vectorized text data 230, which is then used as the starting point for sentiment 100 and misinformation risk 400 classification.

To classify the quantitative sentiment value 140 conveyed through the vectorized text data 230, a set of neural network ML models 130 are used to make a number of sentiment classifications. As confidence in ML technology has grown, people have moved towards using a single model to make their desired predictions. In the context of this invention, such an approach would result in one model that takes in vectorized text and returns the sentiment value 140 of the text. Unfortunately, we find that with limited training data, such an approach does not work nearly as well when compared to the system we present here. In the presently disclosed subject matter, a number of ML models are used to determine the results of sub-classification problems: neutral vs not neutral, positive vs negative, strongly positive vs positive, strongly negative vs negative. By using a number of models which each handle a more basic problem, we can lower the accuracy requirement of the models, which is beneficial when the amount of training data is limited. The sub-classification problems were specifically chosen to construct a mathematical description of sentiment as a vector in a 5-dimensional space: strongly negative, negative, neutral, positive, and strongly positive. A given piece of text may convey multiple sentiments at once and since we are interested in determining the overarching sentiment, the problem is decomposed into finding the basis sentiment with the largest representation in the final vector.

Figure 3:
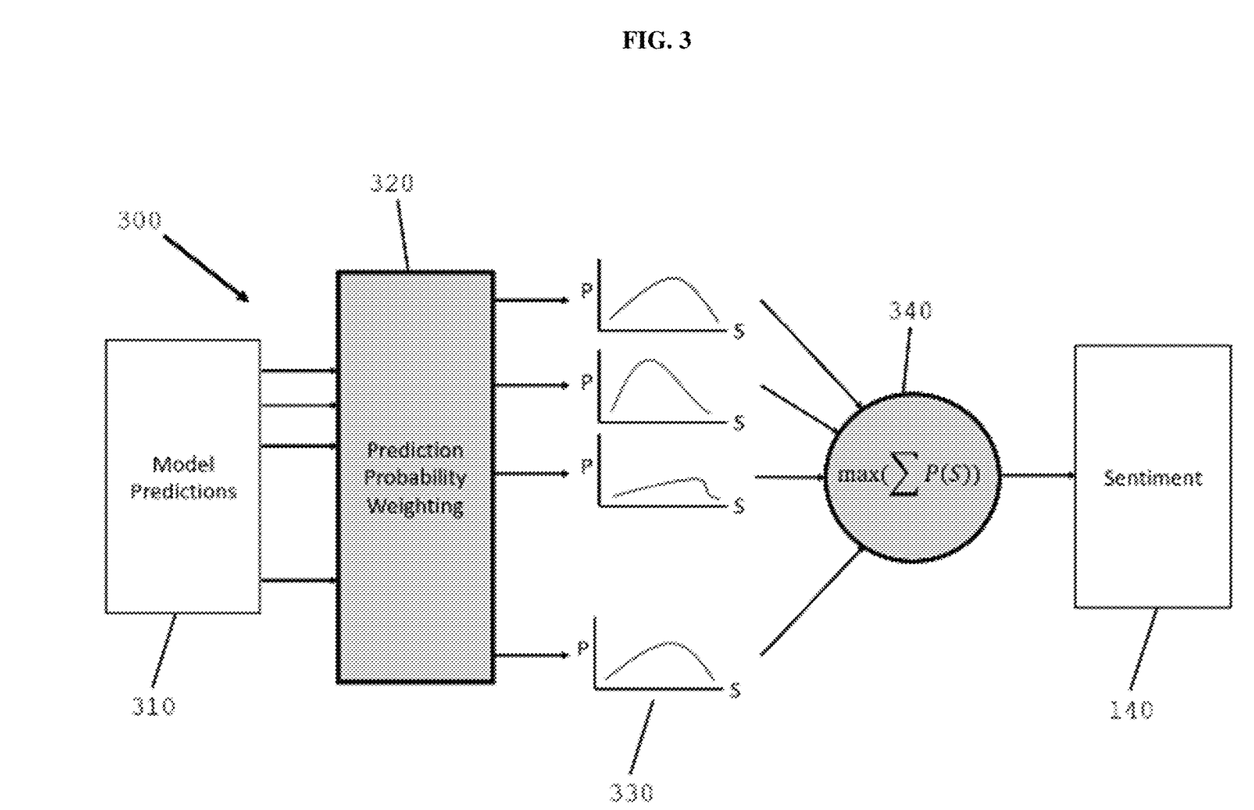
FIG. 3 is a more detailed block diagram illustrating the processes 300 needed within FIG. 1 in which, a number of model predictions 310 are turned into weighted probability distributions and summed to get a final numeric sentiment value, in accordance with various embodiments of the disclosed subject matter.

For each sub-classification scheme, a ML model was trained on a set of pre-labeled training data. The outputs of these models are then combined in the manner seen depicted in 330 and in Equation 1 below. As some of the classification schemes encompass multiple sentiment values 140, such as neutral vs not for example, the most general way to express the outputs of each model was determined to be as discrete probability distributions. For instance, if the neutral vs not model determined that a piece of text was not neutral, it would return a discrete probability distribution (PDF) which gives an equal chance for the text to be strongly negative, negative, positive, and strongly positive and gives no chance that the text is neutral. The resulting discrete probability distributions for each model are then summed to give the probability distribution, which roughly describes the distribution of sentiments of the text. The final sentiment value 140 of the text is then defined as the maximum value of the probability distribution in Equation 1.

$$\text{Sentiment} = \max(\Sigma_i w_i * \text{PDF}_i) \quad (1)$$

In FIG. 3, a number of model predictions 310 are turned into weighted probability distributions and summed to get a final numeric sentiment value, in accordance with various embodiments of the disclosed subject matter. Additional weights (w) 320 are introduced to increase or decrease the effect of a given model on the final probability distribution. The model in Equation 1 is then fit to an additional set of training data to determine the optimal sets of weights (w) that most accurately describe the training data. Once the general set of weights has been obtained, they may be adjusted manually to tweak the model behavior in order to adjust to trends which may be relevant to a specific official. For instance, if the model is being used to determine the sentiment of publicly available text related to something mundane, like the weather, the probability distributions associated with neutral sentiment could be intentionally weighted more than normal to accommodate for the likely overwhelming number of neutral sentiment text.

The final predicted sentiment value 140 of a piece of text ranges between −1 and +1 which corresponds to strongly negative and strongly positive sentiment, respectively. Intermediate values correspond to more neutral sentiment with true neutral sentiment being exactly 0. Further, the range of possible sentiment values is a discrete set of 5 numbers. Several examples of predicted sentiment values 140 are included in Table 1.

TABLE 1

Sample Text and Quantitative Sentiment Values

| Text | Sentiment Value |
| --- | --- |
| This is the worst service ever received! | −1 (Strongly Negative) |
| I take the trains to work. | 0 (Neutral) |
| Thank you very much! Your hard work is greatly appreciated! | 1 (Strongly Positive) |

When using the model processes 300 in Equation 1 to analyze the sentiment of a conversation, as opposed to an individual piece of text, the sign, or polarity, of the sentiment of the text is adjusted to reflect the context of the discussion as previously outlined. Take the following example:
Parent Post: "This is terrible"—Person A
Reply to Post: "I disagree"—Person B
Reply to Reply: "You are wrong"—Person C The first, or parent, post by Person A would be scored in the normal process outlined above and seen in Equation 1 and would have a value of −1 (strongly negative). The reply to the post, written by Person B, would be scored by the same model and give a value of −0.5 (negative). However, this reply was made in disagreement with the original post, therefore, the sign of the sentiment value 140 would change. The true resulting sentiment value 140 of Person B is now 0.5 (positive). The same logic is then applied to the reply of Person C to Person B of Person A. Mathematically, this sentiment polarity model is expressed in Equation 2 in which, the sentiment value 140 (S) of a piece of text is multiplied by the signs of the sentiments of the j parent comments, excluding all neutral sentiment values 140. The resulting corrected sentiment ($S_c$) is returned as the final value.

$$S_c(t) = \prod_j \text{sgn}_{[S_j != 0]}(S_j) * S(t) \quad (2)$$

To classify the quantitative misinformation risk 430 conveyed through the text, a sequence of operations is performed in which the text processing transformers 200 vectorize and reduce the dimensionality of the text from the digital communication platform. Additionally, the body of text that is predefined by the official to be factually correct is transformed by the same sentiment model 100 and text comparison operator 420 processes. The end goal of the misinformation risk model 400 is the quantification of the risk that a body of text conveys contradictory information to the factual body of text. From studying trends in the training data, we determined that text that displayed a high risk of misinformation tended to display both largely negative sentiments and similar trends in the 'cosine similarity' metric (to be explained later). Thus, the phenomenological model for misinformation risk was constructed by considering only the sentiment of the text which is calculated using process 300, as well as the cosine similarity of the text with the factually correct text 410.

A cosine similarity metric, expressed in Equation 3, simply takes the normalized inner product between two vectors in the same space, which results in the cosine of the angle between the two vectors.

$$CS(a, b) = \frac{<a|b>}{|a||b|} = \cos(\theta_{a-b}) \quad (3)$$

Since the basis of the text vectors represent the unigrams and bigrams of the actual text, mathematical similarity between two text vectors indicates textual similarity. Numbers close to 0 indicate that the two text vectors are aligned and thus, have overlapping text tokens. Numbers close to 1 indicate that the two text vectors are perpendicular and thus, have different tokens. Several examples of the comparison to 'the Earth revolves around the Sun' are given in Table 2.

TABLE 2

Sample Text and Quantitative Similarity Measurements

| Text | Similarity |
| --- | --- |
| The Earth revolves around the Sun | 0 (Same) |
| The Earth does not orbit the Sun | 0.5 (Medium Similarity) |
| Orange is my favorite color | 1 (No Similarity) |

Figure 5:
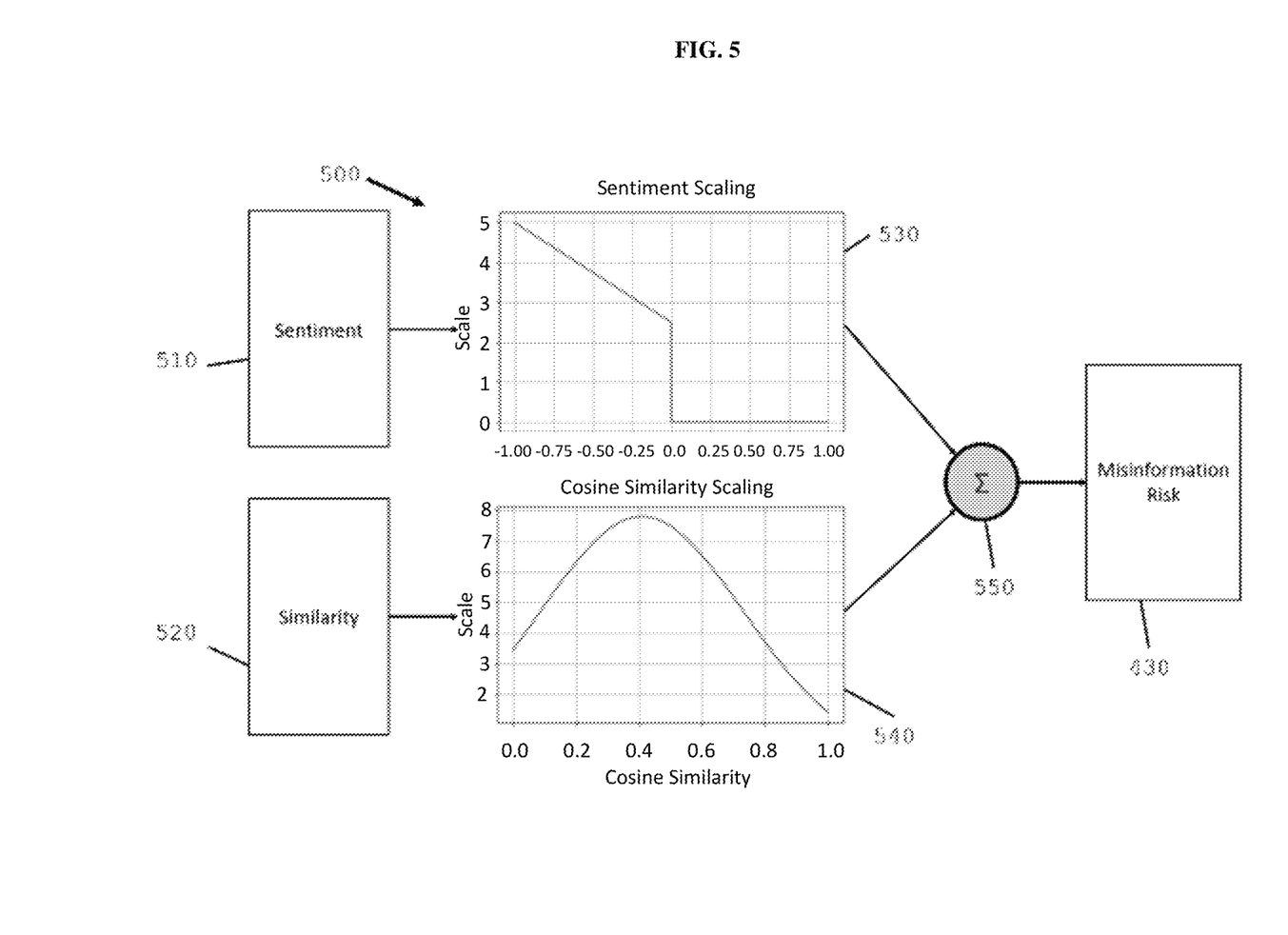
FIG. 5 is a detailed block diagram illustrating the processes needed within FIG. 4 in which, the quantitative sentiment value of a body of text as well as the quantitative similarity between said body of text and an additional body of text predefined as the 'truth' are weighted and summed to produce the quantitative misinformation risk value of the text, in accordance with various embodiments of the disclosed subject matter.

The values included in Table 2 represent the behavior of a cosine similarity operator. As seen in Table 2, identical text has a value of 0 while text that is somewhat similar has a more intermediate value. Of interest, are values that are close to 1. In these cases, the text has no similarity, which indicates the discussion of two different topics as seen in the final entry in Table 2. Additional studies of the training data indicated that dissenting text falls within intermediate similarity values. In order to adjust the behavior of the similarity operator to better model this factual disagreement, the output of the cosine similarity metric between a predefined true text (T) and a given piece of text (t) is used as the input of a Gaussian distribution 540, which gives a Scaled Cosine Similarity (SCS) as seen in Equation 4. This distribution then scales a similarity metric 520 most when it is near the mean of the distribution and the least when it is far away from the mean, as seen in 540.

$$SCS(t, T) = \beta \exp\left(-\left(\frac{CS(t, T) - \mu}{\sigma}\right)^2\right) \quad (4)$$

The mean and standard deviation of this Gaussian distribution 540 serve as a way to adjust the similarity metric's behavior. It is desirable to adjust the mean of the Gaussian distribution 540 such that it coincides with the cosine similarity metric values of text which contains misinformation. The standard deviation serves as a way to build in a tolerance window for misinformation that has a cosine similarity metric 540 that does not directly coincide with the mean of the Gaussian distribution. For instance, a wider standard deviation would result in a wider range of cosine similarity measurements that indicate misinformation. Due to the topic-dependent nature of misinformation risk assessment, the mean and standard deviation of this distribution are fit to a set of training data—this process will be discussed later. As seen at the rightmost region of the Gaussian distribution 540, text vectors with completely different meaning may or may not be scaled the least so as to not penalize unrelated text.

Similarly, a sentiment value or sentiment values 510 of the text vectors or batch of text vectors are scaled 530 using a linear function as seen in Equation 5, which scales negative sentiment values 510 to a degree corresponding linearly to the magnitude of the sentiment. For instance, strongly negative text has been shown to have a higher chance of containing misinformation than weakly negative text. This relationship is expressed in the sentiment weighting distribution (SWD) 530 seen in Equation 5.

$$SWD(t) = (-m * S_c(t) + b) * (S_c(t) < 0) \quad (5)$$

To then obtain the misinformation risk (MR) 430 for a given piece of text (t) and the predefined true text (T), the sentiment weighting distribution (SWD) 530 is added to the scaled cosine similarity (SCS) 540 as seen in Equation 6.

$$MR(t, T) = SWD(t) + SCS(t, T) \quad (6)$$

The misinformation risk (MR) 430 is then fit to a set of labeled training data that is also specific to the true body of text (T) in order to determine the optimal parameter values of $\beta$, $\mu$, $\sigma$, m, and b such that the misinformation risk model best describes the data. For example, when using this model to predict the misinformation risk of text related to the topic "the earth is flat", a list of text is labeled with their associated misinformation risks. Once done, the entire model is fit to this dataset through the adjustment of the model parameters. Once the model is fit, the optimal values for the mean and standard deviation are saved with a copy of the model so that they can be re-used. Additionally, the weighting scheme has the ability to be manually tweaked or re-adjusted to obtain a different performance from the model in a fashion not dissimilar from that mentioned in a sentiment model 100. Furthermore, if it is desired for the model to detect the risk of misinformation about another topic, one would need to collect a new body of factual text and re-fit the mean and standard deviation according to a dataset related to the new topic.

The resulting misinformation risk values typically run between 0 and 10 with 0 indicating the lowest misinformation risk and 10 indicating the highest misinformation risk. Again, this specific weighting and subsequent combination of sentiment value 140 and similarity was specifically selected to phenomenologically model the risk that a body of text contains misinformation through several studies of the training data.

In some embodiments of the disclosed subject matter, the sets of operations described in the previous paragraphs as well as in FIGS. 1, 4, and 5 can be implemented in a process, a method, and/or a system where all of the operations are performed, as well as, in some other embodiments, less than all of the operations are performed. Additionally, the operations can be performed in sequence, in different orders, or in parallel, in some embodiments of the disclosed subject matter. The processes described in FIGS. 1, 4, and 5 are not necessarily restricted to the operation flow depicted in their diagrams.

A computerized method including: receiving, via a network, at least one digital transcription of a conversation or statement from a digital communication platform; determining, by a processor, from the digital transcription of the conversation or statement, a conveyed quantitative sentiment value using a plurality of machine learning (ML) techniques, the determining the conveyed quantitative sentiment value comprising the steps of: a. processing the at least one digital transcription of the conversation into a machine interpretable form by unigram and bigram Term Frequency-Inverse Document Frequency (TF-IDF) vectorization and 100-Dimensional Singular Value Decomposition (SVD); b. calculating, using a set of trained neural network ML models, a sentiment sub-classification problem from the transformed text; c. calculating discrete sentiment probability distributions related to a sentiment classification of each model; d. calculating the weighted sum of the discrete sentiment probability distributions; and e. calculating a maximum of the discrete sentiment probability distributions and returning the corresponding sentiment as a final sentiment classification.

A computerized method including: receiving, via a network, at least one digital transcription of a conversation or statement from a digital communication platform; storing on a computer or server, at least one digital transcription of a body of text predefined to be factually correct, determining, by a processor, from the digital recording of the conversation, a conveyed risk of misinformation via the use of a plurality of machine learning (ML) techniques by performing operations on the transcription of the conversation or statement, the determining comprising the steps of: a. processing the at least one digital transcription of the conversation and the body of text containing predefined factual text into a machine interpretable form by unigram and bigram Term Frequency-Inverse Document Frequency (TF-IDF) vectorization and 100-Dimensional Singular Value Decomposition (SVD); b. processing, using steps b-e in claim 1, a conveyed sentiment of the digital conversation; c. calculating a cosine similarity between the vectorized forms of the text and the predefined factual text; d. calculating a gaussian scaled cosine similarity by using the cosine similarity as the argument for a gaussian distribution of a specified mean, standard deviation, and height; e. calculating a linearly scaled sentiment form of the sentiment by passing the calculated sentiment into a linear function which takes nonzero values only when the sentiment is negative and has a specified negative slope and intercept; and calculating a misinformation risk of the given text compared to the predefined factual text by adding the linearly scaled sentiment and the gaussian scaled cosine similarity.

While the disclosed subject matter has been described in conjunction with a number of embodiments, it is evident that many alternatives, modifications and variations would be or are apparent to those of ordinary skill in the applicable arts. Accordingly, the applicant intends to embrace all such alternatives, modifications, equivalents, and variations that are within the spirit and scope of the disclosed subject matter described herein.

What is claimed is:

1. A computer-implemented method comprising:
   receiving, via a network, at least one digital transcription of a conversation or statement from a digital communication platform;
   determining, by a processor, from the digital transcription of the conversation or statement, a conveyed quantitative sentiment value using a plurality of machine learning (ML) techniques, the determining the conveyed quantitative sentiment value comprising the steps of:
   a. processing the at least one digital transcription of the conversation into a machine interpretable form by unigram and bigram Term Frequency-Inverse Document Frequency (TF-IDF) vectorization and 100-Dimensional Singular Value Decomposition (SVD);
   b. calculating, using a set of trained neural network ML models, a 0 sentiment sub-classification problem from the machine interpretable form;
   c. calculating a discrete sentiment probability distribution related to a sentiment classification of each model;
   d. calculating a weighted sum of the discrete sentiment probability distributions; and
   e. calculating a maximum of the discrete sentiment probability distributions and returning the corresponding sentiment as a final sentiment classification.

2. The computer-implemented method of claim 1 wherein the sentiment sub-classification problem is one of strongly negative vs negative, negative vs positive, positive vs strongly positive, neutral vs not.

3. The computer-implemented method of claim 1 wherein predictions of each of the ML models are transformed into the discrete sentiment probability distributions.

4. The computer-implemented method of claim 1 wherein the discrete sentiment probability distributions are multiplied with weights and added together to construct a full sentiment model.

5. The computer-implemented method of claim 1 wherein a sentiment label associated with the maximum of a weighted, summed discrete probability distribution is returned as the final sentiment classification for the conversation of statement.

6. The computer-implemented method of claim 1 wherein an optimal set of weights used to multiply each model's discrete sentiment probability distribution are determined through fitting a full sentiment model to a set of training data.

7. The computer-implemented method of claim 1 wherein the receiving, via the network, the at least one digital transcription of the conversation or statement from the digital communication platform comprises: receiving, via the network, the at least one digital transcription of the conversation or statement from at least one of Facebook, Twitter, or Reddit.

8. A computer-implemented method comprising:
   receiving, via a network, at least one digital transcription of a conversation or statement from a digital communication platform;
   storing on a computer or server, at least one digital transcription of a body of text predefined to be factually correct,
   determining, by a processor, from the digital recording of the conversation, a conveyed risk of misinformation via the use of a plurality of machine learning (ML) techniques by performing operations on the transcription of the conversation or statement, the determining comprising the steps of:
   a. processing the at least one digital transcription of the conversation and the body of text containing predefined factual text into a machine interpretable form by unigram and bigram Term Frequency-Inverse Document Frequency (TF-IDF) vectorization and 100-Dimensional Singular Value Decomposition (SVD);
   b. processing, using steps b-e in claim 1, a conveyed sentiment of the conversation or statement;
   c. calculating a cosine similarity between vectorized forms of the body of text and the predefined factual text;
   d. calculating a gaussian scaled cosine similarity by using the cosine similarity as an argument for a gaussian distribution of a specified mean, standard deviation, and height;
   e. calculating a linearly scaled sentiment form of the sentiment by passing the calculated sentiment into a linear function which takes nonzero values only when the sentiment is negative and has a specified negative slope and intercept;
   f. calculating a misinformation risk of the body of text compared to the predefined factual text by adding the linearly scaled sentiment and the gaussian scaled cosine similarity.

9. The computer-implemented method of claim 8 wherein a first specified vectorized piece of text is compared to a second specified vectorized piece of text that is predefined as truth, by means of a cosine similarity operator.

10. The computer-implemented method of claim 8 wherein a resulting cosine similarity between a first specified vectorized piece of text and a second specified vectorized piece of text is passed as an argument of a gaussian distribution with a specified height, mean, and standard deviation.

11. The computer-implemented method of claim 8 wherein a first specified vectorized piece of text is used to calculate a sentiment value of the vectorized text.

12. The computer-implemented method of claim 8 wherein the sentiment of the text is used as an argument of the linear function with a specified, negative slope and intercept and only has nonzero values when the sentiment is negative.

13. The computer-implemented method of claim 8 wherein the linearly scaled sentiment and a gaussian scaled similarity measurement are added together to obtain the misinformation risk posed by the vectorized form of the text with respect to the vectorized form of the factually correct text.

14. The computer-implemented method of claim 8 wherein an optimal height, mean, and standard deviation of a gaussian function, used in scaling a similarity measurement, as well as an optimal slope and intercept of the linear function, used in scaling the linearly scaled sentiment, are obtained by fitting a misinformation risk model to a set of labeled training data.

15. The computer-implemented method of claim 8 wherein the receiving, via the network, the at least one digital transcription of the conversation or statement from the digital communication platform comprises: receiving, via the network, the at least one digital transcription of the conversation or statement from at least one of Facebook, Twitter, or Reddit.

\* \* \* \* \*